United States Patent
Restivo et al.

(10) Patent No.: US 12,313,122 B2
(45) Date of Patent: May 27, 2025

(54) BEARING UNIT WITH REINFORCED RETENTION CAGE

(71) Applicant: AKTIEBOLAGET SKF, Gothenburg (SE)

(72) Inventors: Riccardo Restivo, Turin (IT); Piero Santangelo, Turin (IT); Gianpiero Scaltriti, Turin (IT); Flora Rosso, Pecetto T.SE (IT)

(73) Assignee: AKTIEBOLAGET SKF (SE)

( * ) Notice: Subject to any disclaimer, the term of this patent is extended or adjusted under 35 U.S.C. 154(b) by 122 days.

(21) Appl. No.: 17/988,044

(22) Filed: Nov. 16, 2022

(65) Prior Publication Data

US 2023/0160426 A1 May 25, 2023

(30) Foreign Application Priority Data

Nov. 24, 2021 (IT) .......................... 102021000029609

(51) Int. Cl.
*F16C 33/41* (2006.01)
*F16C 33/38* (2006.01)

(52) U.S. Cl.
CPC ........ *F16C 33/416* (2013.01); *F16C 33/3831* (2013.01)

(58) Field of Classification Search
None
See application file for complete search history.

(56) References Cited

FOREIGN PATENT DOCUMENTS

| | | | | |
|---|---|---|---|---|
| JP | H0979265 | 3/1997 | | |
| JP | H109272 | 1/1998 | | |
| JP | 2006161922 | 6/2006 | | |
| JP | 2007263280 A | * 10/2007 | .......... | F16C 33/3831 |
| JP | 2011127713 A | * 6/2011 | .......... | F16C 33/3831 |
| JP | 2012189196 | 10/2012 | | |

OTHER PUBLICATIONS

Translation of JP2006161922 obtained Jun. 4, 2024.*
Translation of JP H0979265 obtained Jun. 4, 2024.*
Search Report for corresponding Italy Patent Application No. 102021000029609 dated Jun. 29, 2022.

* cited by examiner

*Primary Examiner* — James Pilkington
(74) *Attorney, Agent, or Firm* — Reed Smith LLP

(57) ABSTRACT

A cage for retaining one or more rolling bodies of a bearing unit, the cage including a rib having a plurality of spherical concave surfaces, and a plurality of circumferentially spaced tenons extending from a first axial side of the rib, each tenon of the plurality of tenons including a plurality of spherical concave surfaces and an armature defining a box shape, the armature including a plurality of first portions resting on a first plane and a plurality of second portions resting on a second plane, each first portion of the plurality of first portions alternating circumferentially with each second portion, and the spherical concave surfaces of the rib defining, with the spherical concave surfaces of the tenons, a plurality of spherical cavities to hold each rolling body of the row of rolling bodies in place.

19 Claims, 4 Drawing Sheets

BEARING UNIT WITH REINFORCED RETENTION CAGE

CROSS-REFERENCE TO RELATED APPLICATIONS

This application is based on and claims priority to Italian Patent Application No. 102021000029609 filed on Nov. 24, 2021, under 35 U.S.C. § 119, the disclosure of which is incorporated by reference herein.

FIELD

The present disclosure relates generally to bearing units. In particular, the present disclosure relates to bearing units having a retention cage for a row of rolling bodies that is especially suited for a high-speed bearing unit, although not required.

BRIEF DESCRIPTION OF THE DRAWINGS

The disclosure will now be described with reference to the attached drawings, which show some non-limiting embodiments thereof, in which.

DETAILED DESCRIPTION

Figure 1:
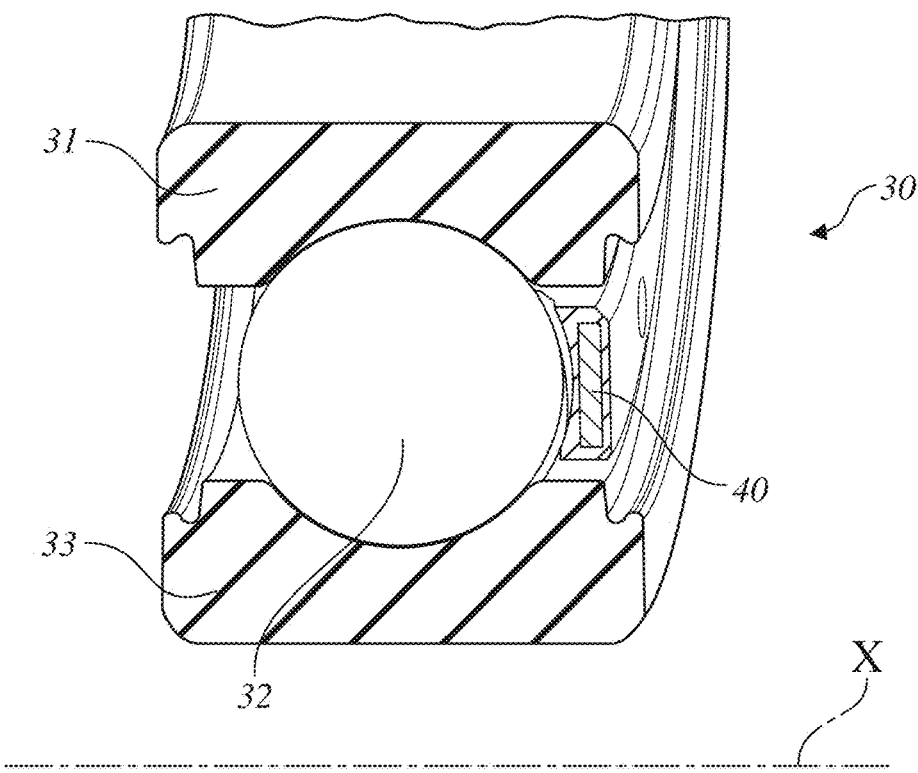
FIG. 1 is a partial cross section of a bearing unit with a cage for containing and retaining one or more rolling bodies according to an exemplary embodiment.

Known retention cages for one or more rolling bodies, e.g., balls, of a bearing unit according to a first type are formed of a rib with a circular base and a plurality of circumferentially spaced fingers or tenons extending from both sides of the rib. The base rib and the fingers have spherically concave surfaces that define between them a plurality of spherical cavities or recesses for holding a respective rolling body of the one or more rolling bodies.

A second known type of retention cage differs from the first type in that the plurality of tenons of the retention cage of the second type extend from just one side of the base rib.

The base rib may be a continuous structural element that extends circumferentially along the cage and constitutes a solid base, giving the cage a rigidity needed to hold the rolling bodies along raceways of the bearing unit, by means of the plurality of tenons.

These cages are referred to as "snap" cages because the rolling bodies are contained and retained as a result of the elastic behavior of the tenons, which can open and close for insertion and retention of the one or more rolling bodies.

In particular, this second type of retention cage is especially used in high-speed bearing units, e.g., Deep Groove Ball Bearing (DGBB) bearing units for applications in the automotive sector (e.g., power units) and industry (e.g., mandrels of machine tools). Specifically, increased use of electrically powered motor vehicles requires ever more efficient performance in terms of, for example, rotational speed of the bearing unit.

The main drawback of a "snap" type cage is limitation on speed due to the rigidity of the polymer used to produce the cage. In particular, during use and at high speeds, the structure of the cage undergoes deformation in all directions. For example, the cage expands in the radial direction, risking contact between a radially outer diameter of the cage and a radially outer ring of the bearing unit and contact between a radially inner diameter of the cage and a radially inner ring of the bearing unit. In contrast, the cavities or recesses open in a direction tangential to the radial direction, resulting in an increased diameter of the cavity or recess. The enlarged diameter can reduce the force that is retaining the rolling body, which can result in the rolling body falling out of the cage.

Furthermore, cages made of a polymeric material are sensitive to temperature and are therefore less efficient at temperatures above the glass transition temperature. For a polymer such as polyamide (e.g., PA 66), this means a temperature of around 70° C. to 80° C.

In bearing units, capacity to reach higher speeds is often measured by a speed index that is obtained by multiplying the number of rotations of the rotating ring of the bearing unit by the mean diameter (pitch diameter) of the bearing unit. This speed index is measured in "mndm", m standing for million, n representing the number of rotations, and dm representing the mean diameter pf the bearing unit.

To counter the increase in deformation of the cage resulting from speed, a first solution is to increase the thickness of the rib. This countermeasure increases the rigidity of the supporting structure of the cage and thus reduces the extent of the deformation resulting from the high speed. A solution of this type is not always feasible, however, since it may require an increase in the axial dimensions of the bearing unit. This can increase cost and make the solution infeasible in light of limited axial space in a layout of assembly for the bearing unit.

Another solution is to reduce the mass of the tenons to reduce the centrifugal force acting on the cage. This second solution, however, has a drawback in a reduced rigidity of the cage, resulting in a lower force of retention of the balls. Therefore, this second solution may not be feasible for high-speed applications, at least when used independently of other countermeasures.

There is therefore a need to design a cage for retaining rolling bodies (e.g., balls, rollers) of bearing units that do not have the aforementioned disadvantages.

An aim of the present disclosure is to provide a retention cage which can be used in bearing units for high-speed applications. As described in greater detail throughout this disclosure, this aim may be achieved with a retention cage of reinforced structure having an armature or the like on which a polymeric material of the rib and of the tenons is over-molded.

Purely by way of non-limiting example, exemplary embodiments of a bearing unit according to the present disclosure will now be described. The bearing unit may be described with reference to a Deep Groove Ball Bearing ("DBGG") bearing unit for high-speed applications. A person or ordinary skill in the art will understand that reference to a DBGG bearing unit is merely illustrative and that alternative types of bearing units may be used without departing from the scope of this disclosure.

With reference to FIG. 1, a bearing unit 30 having a central axis of rotation X may include a stationary radially outer ring 31, a rotatable radially inner ring 33, a row of rolling bodies 32, e.g., balls, inserted between radially outer ring 31 and radially inner ring 33, and a cage 40 for holding the rolling bodies of the row of rolling bodies 32 in place.

Throughout the present disclosure and in the claims, terms and expressions indicating positions and orientations such as "radial" and "axial" are intended with reference to central axis of rotation X of bearing unit 30, where not otherwise specified. For the sake of simplicity, the term "ball" may be used by way of example in the present description and in the attached drawings instead of the more generic term "rolling body." Furthermore, the numeral 32 may be used to refer to the row of rolling bodies or an individual rolling body in the row of rolling bodies.

Figure 2:
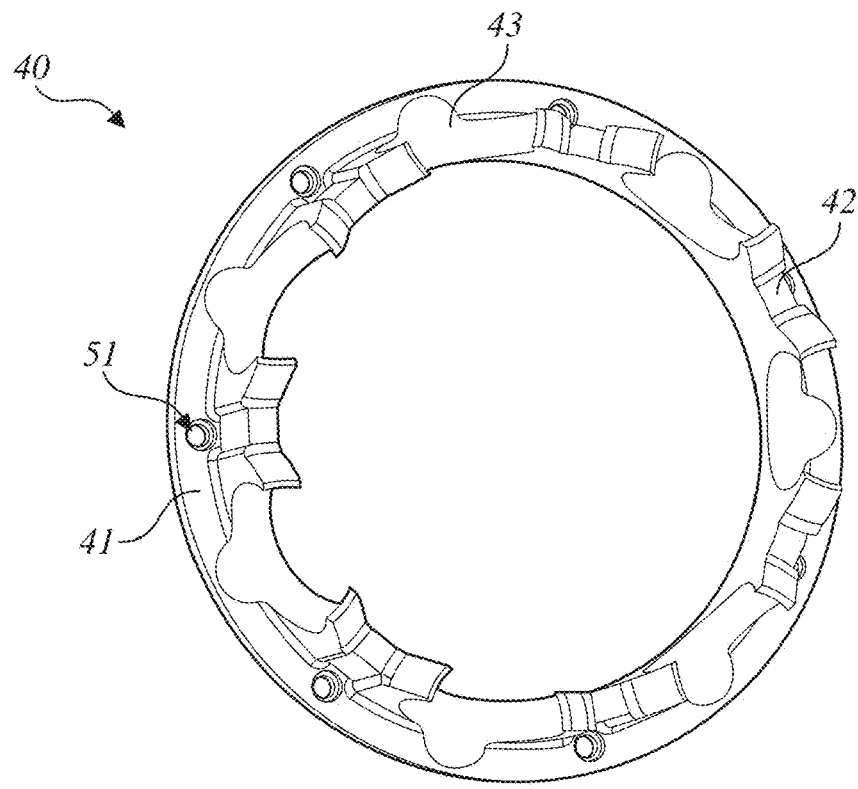
FIG. 2 is an axonometric view of a cage for one or more rolling bodies according to an exemplary embodiment of this disclosure.
Figure 3:
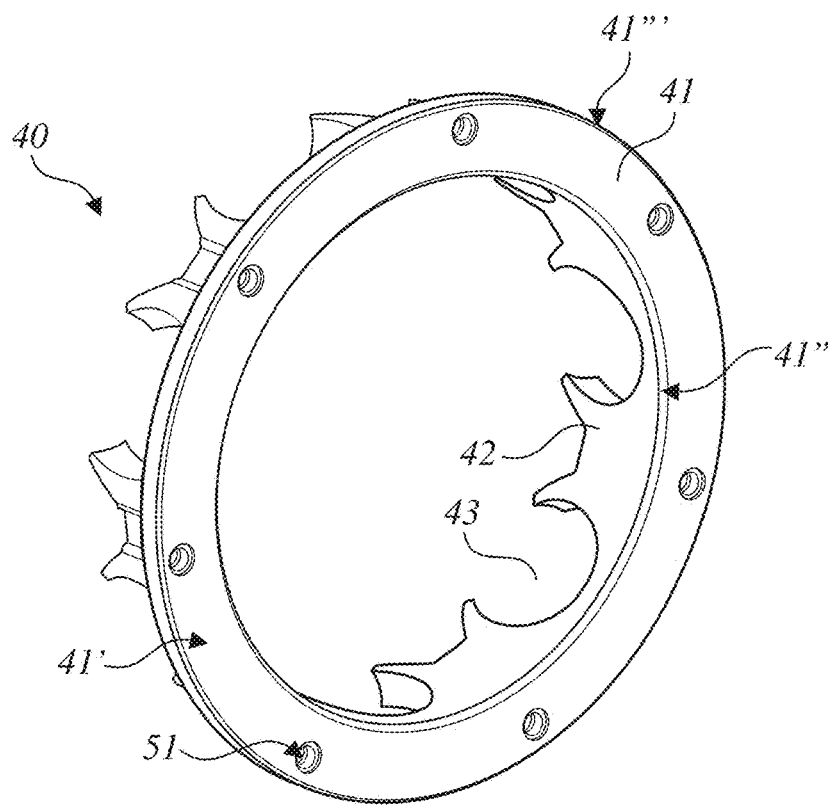
FIG. 3 is a second axonometric view of the cage of FIG. 2.
Figure 4:
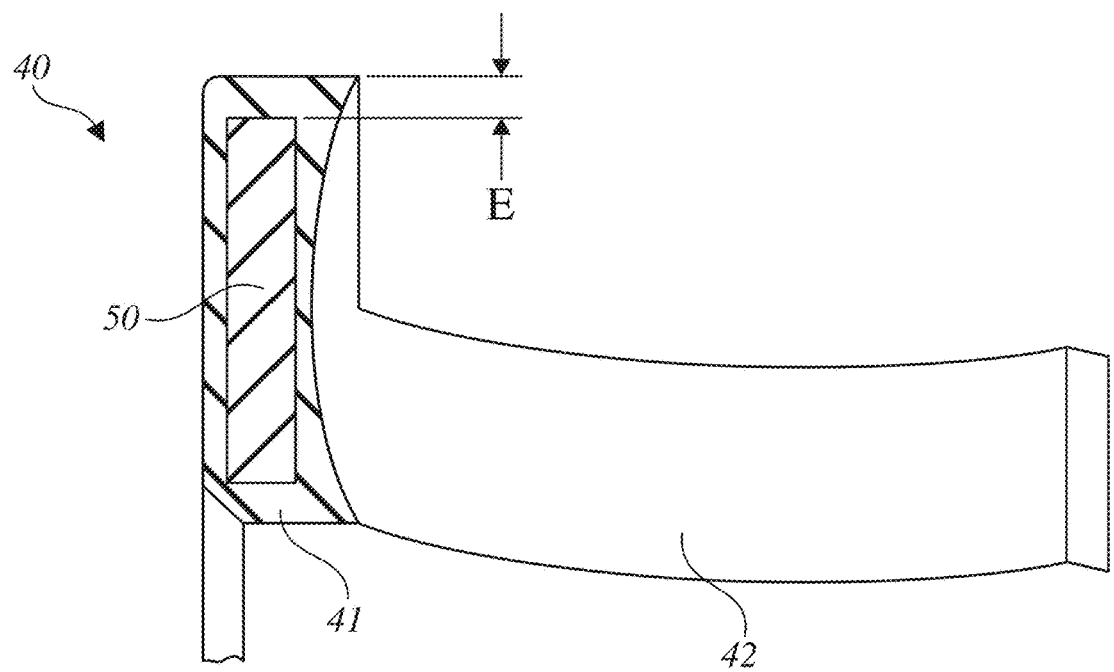
FIG. 4 is a detail view of the cage of FIG. 2, illustrating an armature for reinforcing the cage according to an exemplary embodiment of this disclosure.
Figure 5:
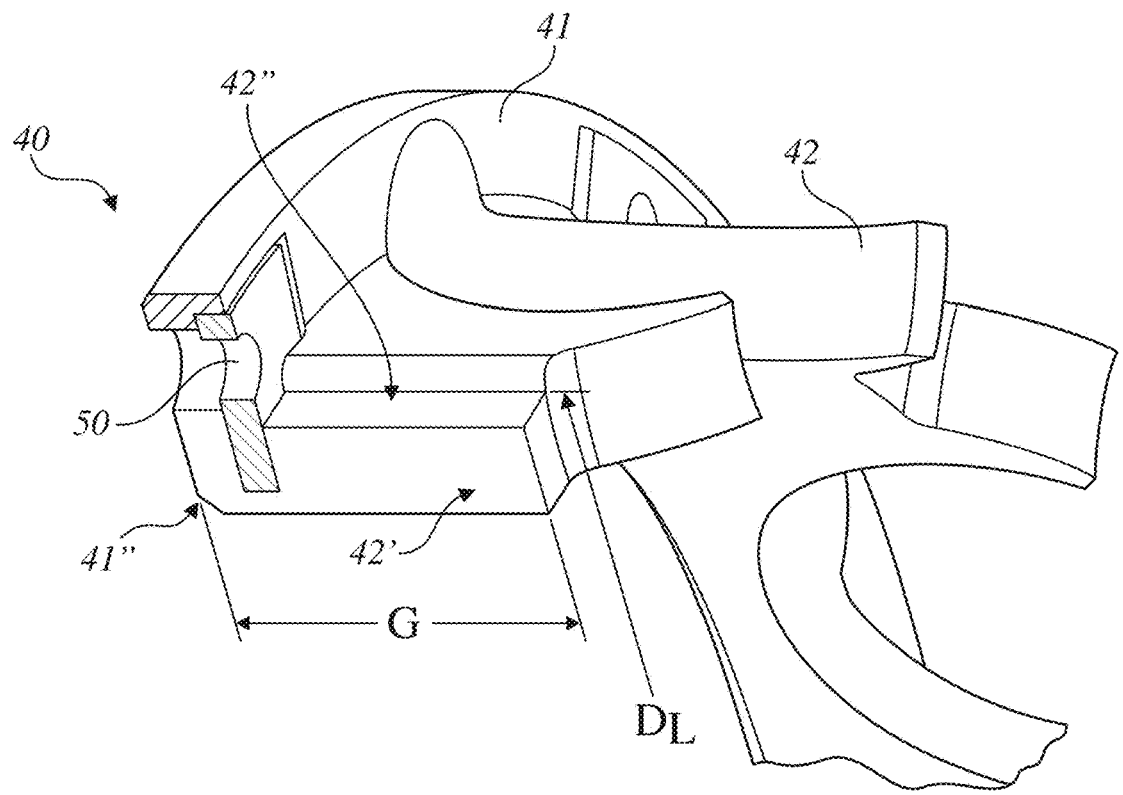
FIG. 5 is an axonometric view of a tenon of reduced mass of the cage of FIG. 2, according to an exemplary embodiment of this disclosure.
Figure 6:
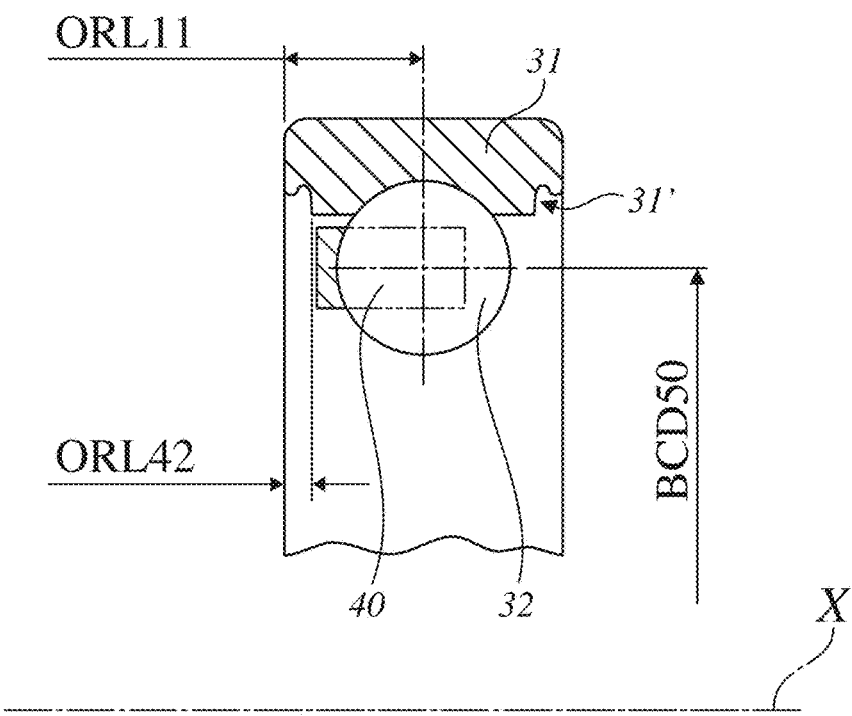
FIG. 6 is a partial cross section of the bearing unit of FIG. 1, according to an exemplary embodiment of this disclosure.
Figure 7:
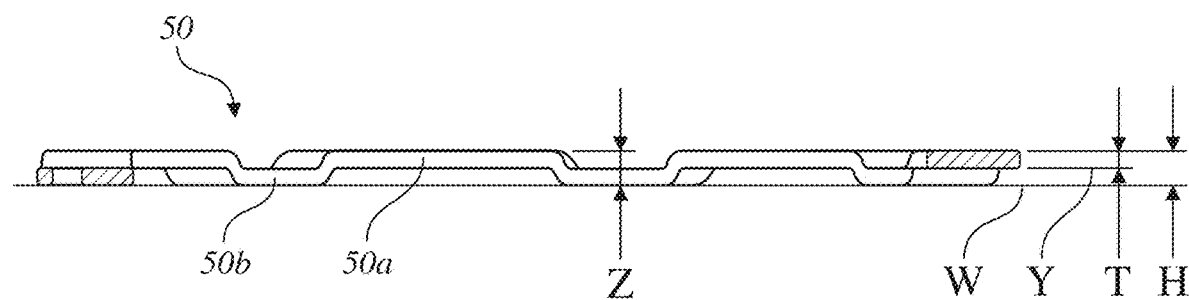
FIG. 7 is an end-on view of the reinforcing armature of the cage of FIG. 2, according to an exemplary embodiment.
Figure 8:
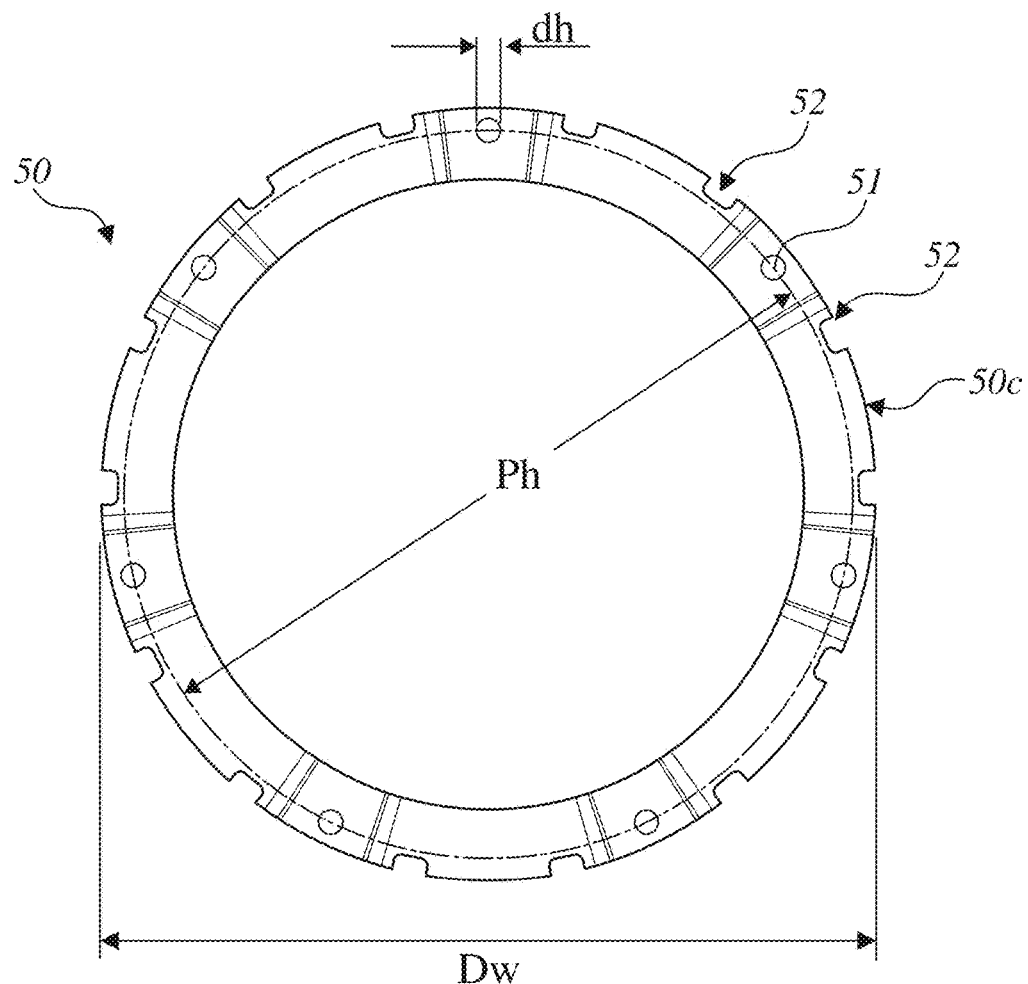
FIG. 8 is an axial view of the reinforcing armature of the cage of FIG. 2, according to an exemplary embodiment.

With reference to FIGS. 2 and 3, cage 40 may include a rib 41 and a plurality of circumferentially spaced tenons 42 about a circumference of rib 41 at a constant pitch and extending from one side of rib 41. In alternative embodiments, tenons 42 may not be evenly spaced around a circumference of rib 41.

In various embodiments, rib 41 and tenons 42 may be made of a polymeric material and include one or more spherical concave surfaces that define between them a plurality of spherical cavities or hollows 43 to hold a respective ball 32 of the plurality of rolling bodies 32. Each cavity 43 may thus be defined by the spherical concave surfaces of the rib 41 and of the spherical concave surfaces of a pair of tenons 42.

Cage 40 may further include an armature 50 rigidly secured to rib 41. In various embodiments, rib 41 may be over-molded around armature 50.

An armature 50 according to this disclosure may take the form of an undulated washer having a box-like shape in which portions of a circular crown alternate circumferentially in two different planes and are connected to one another. A plurality of first portions 50a of circular crown rests on a first plane Y and a plurality of second portions 50b of circular crown rests on a second plane W. The box-like shape creates a very rigid armature, and in any case an armature having a greater rigidity than an armature having a shape of a flat washer, and reduces a bending moment arm of the centrifugal force acting on tenons 42.

Advantageously, in various embodiments, tenons 42 may have at least one shaped and tapered edge 42' such that an overall mass of tenon 42 is streamlined.

Tapered edge 42' may have an axial length G that is a function of an axial half-width ORL11 of radially outer ring 31 and of an axial width ORL42 of a discharge edge 31' of radially outer ring 31, according to:

$$0.5 < G < (ORL11 - ORL42)$$

Tapered edge 42' may extend radially as far as a radially outer surface 42" having a diameter DL measured as the diameter of a circle drawn through each of radially outer surface 42" of each tapered edge 42' of each tenon 42. Diameter DL is a function of a mean diameter BCD50 of bearing unit 30 and of a diameter Dw of the row of rolling bodies 32 according to the following formula:

$$DL = BCD50 + 0.05 \times Dw$$

Cage 40 may thus assume a substantially "L" shape with the web of the "L" including tapered tenons 42. This arrangement reduces cage 40's sensitivity to centrifugal forces. Any resulting reduction of overall strength of cage 40 may be compensated for by the increase in strength resulting from the presence of armature 50.

The reduction in the bending moment arm of the centrifugal force acting on tenons 42 acts in synergy with the substantially "L" shape of cage 40 as a whole which, with respect to known cages, in turn reduces a mass of a tenon 42 subjected to the centrifugal force. Creating rigidity in cage 40 in this way, i.e., by including an armature 50 with a box-like structure, is particularly advantageous because armature 50 is kept inside rib 41 of cage 40 and, therefore, does not enter space between cage 40 and rolling bodies 32. This maintains a degree of flexibility between cage 40 and rolling bodies 32 so as to ensure fitting of the cage/rolling bodies assembly in bearing unit 30 without risk of breaking tenons 42.

In various embodiments, armature 50 has an overall height H that can range from 0.3 mm to 1.2 mm. First and second portions 50a and 50b may have a thickness not less than 0.2 mm while the difference Z in axial position between the first portions 50a and second portions 50b may vary between 0.1 mm and 0.25×Dw, Dw being the diameter of the row of rolling bodies 32. Armatures having a thickness less than 0.2 mm may compromise the rigidity of cage 40, and a thickness that is too large may require axial dimensions of a cage that would be incompatible with the physical constraints of a cage 40 according to the present disclosure.

Positioning of armature 50 inside a mold in which the polymeric material of cage 40 is over-molded and the attachment resulting from the over-molding are both important.

In various embodiments, armature 50 may be a distance E from radially outer surface 41''' of rib 41 that is a function of diameter Dw of the row of rolling bodies 32, but may be no greater than 0.45×Dw mm.

In embodiments in which distance E is zero, armature 50 may be centered on radially outer surface 41''' of rib 41.

In various embodiments, armature 50 may include a plurality of circumferentially spaced through holes 51. A center of each through hole 51 may lie along a circumference of armature 50 defined by a diameter Ph that is a function of the mean diameter BCD50 of bearing unit 30 and of the diameter Dw of the row of rolling bodies 32 according to:

$$Ph = BCD50/2 + 0.1 \times Dw$$

A diameter of through holes 51 may vary from a minimum of 0.1 mm to a maximum calculated as a function of the diameter Dw of the row of rolling bodies 32 and equal to 0.2×Dw mm.

A total number of through holes 51 may preferably be equal to a number of rolling bodies 32, or to a number of tenons 42 of cage 40, or may be a multiple of the number of such elements. These through holes 51 act as a guide for the axial and radial positioning of armature 50 in the mold for subsequent over-molding of the polymeric material.

Through holes 51 may also assist with the mechanical gripping for the polymer of a cage 40 being over-molded.

To improve the position of armature 50 inside the mold, a further guide may be defined a radially inner rounding 41" on a surface of a base 41' of rib 41, the surface on a side of rib 41 axially opposite to tenons 42.

Furthermore, to improve attachment of the polymeric material and, consequently, prevent relative rotation of armature 50 with respect to rib 41 of cage 40, armature 50 may have a plurality of slots 52 into which the polymeric material may flow during over-molding. Slots 52 may be arranged at or near a radially outer edge 50c of armature 50.

In various embodiments, pairs of slots 52 may be circumferentially spaced about armature 50 and be positioned on either side of each through hole 51. In other words, each through hole 51 will be flanked by a pair of slots 52, and therefore the number of slots 52 will be double the number of through holes 51.

An armature 50 according to the present disclosure may be made of metal material. In various embodiments, second portions 50b may be obtained by deep-drawing from a flat washer according to known processes. Slots 52 are included to prevent detachment of the polymeric material from the metal material of armature 50, as a chemical connection may be formed with the polymeric material in slots 52. Forming a chemical connection of the polymeric material in slots 52 eliminates relative movements between cage 40 and armature 50.

Alternatively, an armature 50 may be made of plastic material that is reinforced with resistant fibers. For example, a plastic armature 50 may consist of polyamide PA66 reinforced with glass fibers at a ratio of 2:1 (i.e. at a rate of 50%). In this case, the box-like shape of the armature 50 that includes first and second portions 50a, 50b of the circular crown alternating in two different planes may be obtained by injection-molding according to known processes. The remainder of cage 40 may be made of polyamide (e.g., PA66) as pure polymer or polymer slightly charged with reinforcing fibers. In the latter case, it may have a lower density than pure polymer. A resulting centrifugal force acting on tenons 42 of such cages may be reduced due to the lower density of the reinforced polyamide material.

Because the armature may be made of plastic material, as the cage is, it may be easier to recycle such cages, as there is no need to separate any metal from plastic. It is however important to be careful when selecting only cages of this type (i.e. with reinforcing armatures) to avoid mixing them up with other cages that do not have a reinforcing armature.

Embodiments of this disclosure are compatible with polymeric materials used for cages, namely, as mentioned above, polyamides. These materials include, but are not limited to, PA66 GF25 and PA46 GF30.

Deformation of a cage 40 according to this disclosure caused by centrifugal forces is reduced by 50% to 70% with respect to deformation of a cage made entirely of polymeric material and without a reinforcing armature 50 as described herein. By decreasing the deformation of cage 40, contact with rolling bodies 32 is also reduced, resulting in less heating of tenons 42 from such contact that can reduce the operating life of cage 40.

All of this therefore makes it possible to reach higher speeds and have a greater capacity for those speeds (e.g., being able to operate a higher speeds for a longer period of time). Embodiments of a bearing unit according to this disclosure can enable speeds corresponding to a speed index of greater than 1 mndm.

Reinforcement of the rib, i.e. of the supporting structure of the cage, offers a very big increase in rigidity and thus allows the cage to reach very high speeds.

Embodiments of a bearing unit, e.g., bearing unit 30, described herein do not require an increase in an axial length of the bearing unit and therefore are compatible with, existing applications of bearing units.

In addition to the embodiments described herein, many other variants exist. It must be understood that these embodiments are simply examples and do not limit the subject matter of this disclosure, its applications, or its possible configurations. On the contrary, although the description above makes it possible for a person skilled in the art to implement the present disclosure according to at least one exemplary configuration thereof, it must be understood that many variations of the components described may be envisaged without thereby exceeding the subject matter of the disclosure as defined in the attached claims, interpreted literally and/or according to their legal equivalents.

We claim:

1. A cage for a row of rolling bodies of a bearing unit, the cage comprising:
    a rib made of a polymeric material, the rib comprising a plurality of spherical concave surfaces; and
    a plurality of circumferentially spaced tenons made of a polymeric material and extending from a first axial side of the rib, each tenon of the plurality of tenons comprising a plurality of spherical concave surfaces; and
    an armature comprising:
        a plurality of first portions resting on a first plane;
        a plurality of second portions resting on a second plane;
        a plurality of through holes spaced circumferentially about the armature; and
        a plurality of slots,
        wherein each first portion of the plurality of first portions alternate circumferentially with each second portion of the plurality of second portions and define a circular crown,
    wherein the spherical concave surfaces of the rib define with the spherical concave surfaces of the tenons a plurality of spherical cavities to hold each rolling body of the row of rolling bodies,
    wherein a difference in axial position of the first portions and the second portions is between 0.1 mm and 25% of a diameter of the rolling bodies of the row of rolling bodies,
    wherein the rib is overmolded around the armature, and
    wherein each through hole of the plurality of through holes is evenly spaced circumferentially about the armature and positioned between a respective pair of slots of the plurality of slots on each side of a respective through hole, wherein a number of pairs of slots is equal to a number of through holes.

2. The cage according to claim 1, wherein each tenon of the plurality of tenons comprise a shaped and tapered edge.

3. The cage according to claim 1, wherein the armature comprises a deep-drawn metal material.

4. The cage according to claim 1, wherein the armature comprises an injection-molded plastic material reinforced with a plurality of resistant fibers.

5. The cage according to claim 4, wherein:
    the injection-molded plastic material comprises a polyamide,
    the plurality of resistant fibers comprise glass fibers, and
    a composite ratio of injection-molded plastic material to resistant fibers is 2:1.

6. A bearing unit comprising:
    a radially outer ring,
    a radially inner ring,
    a row of rolling bodies interposed between the radially outer ring and the radially inner ring; and
    a cage for the row rolling bodies, the cage comprising:
        a rib made of a polymeric material, the rib comprising a plurality of spherical concave surfaces; and
        a plurality of circumferentially spaced tenons made of a polymeric material and extending from a first axial side of the rib, each tenon of the plurality of tenons comprising:

a plurality of spherical concave surfaces; and
one or more tapered edges, wherein each of the one or more tapered edges comprises:
a radially outer surface comprising a diameter equal to a sum of a mean diameter of the bearing unit and 5% of a diameter of of the row of rolling bodies, wherein the diameter of the radially outer surface of the one or more tapered edges is measured as a diameter of a circle drawn through each radially outer surface of each of the one or more tapered edges of each of the circumferentially spaced tenons; and
an axial length that is less than a difference of an axial half-width of the radially outer ring and an axial width of a discharge edge of the radially outer ring, the discharge edge positioned between an axially outer surface of the radially outer ring and an axially outer surface of the cage; and
an armature comprising:
a plurality of first portions resting on a first plane; and
a plurality of second portions resting on a second plane,
wherein each first portion of the plurality of first portions alternate circumferentially with each second portion of the plurality of second portions and define a circular crown,
wherein the spherical concave surfaces of the rib define with the spherical concave surfaces of the tenons a plurality of spherical cavities to hold each rolling body of the row of rolling bodies.

7. The bearing unit according to claim 6, wherein the rib is overmolded around the armature.

8. The bearing unit according to claim 7, wherein the armature further comprises:
a plurality of through holes spaced circumferentially about the armature.

9. The bearing unit according to claim 8, wherein the armature further comprises a plurality of slots.

10. The bearing unit according to claim 9, wherein each through hole of the plurality of through holes is evenly spaced circumferentially about the armature and positioned between a pair of slots of the plurality of slots.

11. The bearing unit according to claim 9, wherein the plurality of through holes are located along a circumference of the armature defined by a diameter equal to a sum of half the mean diameter of the bearing unit and 10% of the diameter of a rolling body of the row of rolling bodies.

12. The bearing unit according to claim 6, wherein the armature comprises a deep-drawn metal material.

13. The bearing unit according to claim 6, wherein the armature comprises an injection-molded plastic material reinforced with a plurality of resistant fibers.

14. The bearing unit according to claim 13, wherein:
the injection-molded plastic material comprises a polyamide,
the plurality of resistant fibers comprise glass fibers, and
a composite ratio of injection-molded plastic material to resistant fibers is 2:1.

15. A cage for a row of rolling bodies of a bearing unit, the cage comprising:
a rib made of a polymeric material, the rib comprising a plurality of spherical concave surfaces; and
a plurality of circumferentially spaced tenons made of a polymeric material and extending from a first axial side of the rib, each tenon of the plurality of tenons comprising a plurality of spherical concave surfaces; and
an armature comprising:
a plurality of first portions resting on a first plane;
a plurality of second portions resting on a second plane;
a plurality of through holes spaced circumferentially about the armature; and
a plurality of slots,
wherein each first portion of the plurality of first portions alternate circumferentially with each second portion of the plurality of second portions and define a circular crown, and
wherein the spherical concave surfaces of the rib define with the spherical concave surfaces of the tenons a plurality of spherical cavities to hold each rolling body of the row of rolling bodies,
wherein a difference in axial position of the first portions and the second portions is between 0.1 mm and 25% of a diameter of the row of rolling bodies,
wherein the rib is overmolded around the armature, and
wherein each slot comprises a radial depth extending radially inward to a point that is more radially outward than a majority of each through hole.

16. The cage according to claim 15, wherein each tenon of the plurality of tenons comprise a shaped and tapered edge.

17. The cage according to claim 15, wherein the armature comprises a deep-drawn metal material.

18. The cage according to claim 15, wherein the armature comprises an injection-molded plastic material reinforced with a plurality of resistant fibers.

19. The cage according to claim 18, wherein:
the injection-molded plastic material comprises a polyamide,
the plurality of resistant fibers comprise glass fibers, and
a composite ratio of injection-molded plastic material to resistant fibers is 2:1.

* * * * *